US006557070B1

(12) United States Patent
Noel, Jr.

(10) Patent No.: US 6,557,070 B1
(45) Date of Patent: Apr. 29, 2003

(54) SCALABLE CROSSBAR SWITCH

(75) Inventor: Francis Edward Noel, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 09/602,090

(22) Filed: Jun. 22, 2000

(51) Int. Cl.$^7$ .............................................. G06F 13/00
(52) U.S. Cl. ...................... 710/317; 370/412; 370/413
(58) Field of Search ....................... 710/52, 316, 317; 370/351, 357, 360, 359, 386, 388, 412, 413, 419

(56) References Cited

U.S. PATENT DOCUMENTS

| | | | |
|---|---|---|---|
| 5,189,665 A | 2/1993 | Niehaus et al. | 370/458.1 |
| 5,309,426 A | 5/1994 | Crouse et al. | 370/58.1 |
| 5,537,400 A | 7/1996 | Diaz et al. | 370/58.2 |
| 5,623,698 A | 4/1997 | Stephenson et al. | 395/858 |
| 5,636,210 A | 6/1997 | Agrawal | 370/390 |
| 5,745,489 A | 4/1998 | Diaz et al. | 370/395 |
| 5,898,692 A | 4/1999 | Dunning et al. | 370/427 |
| 6,167,489 A | * 12/2000 | Bauman et al. | 711/145 |

FOREIGN PATENT DOCUMENTS

WO   WO 99/11033   3/1999

OTHER PUBLICATIONS

"Lookaside Input Buffer for Packet Switching", IBM Technical Disclosure Bulletin, Aug. 1985, vol. 28, No. 3, pp. 1255–1259.*

"Scalable, Modular, Interconnection Cache Network Structure for Temporarily Localized Communication Requests," *IBM Technical Disclosure Bulletin*, vol. 34 No. 10A, Mar. 1992, pp. 66–68.

* cited by examiner

*Primary Examiner*—Xuan M. Thai
(74) *Attorney, Agent, or Firm*—Winstead, Sechrest & Minick

(57) ABSTRACT

A scalable crossbar switch is enabled by a single crossbar switch chip building block that incorporates input and output queuing circuits. The input and output queuing circuits can by selectively bypassed by voltages applied to configuration inputs. A circuit card used to construct a crossbar switch from the switch chips has the configuration inputs wired to the appropriate voltages so that when a switch chip is placed in a location the correct input or output queuing circuits are bypassed preserving the correct level of queuing and minimizing delays. The single crossbar switch chip building block also has line drivers after the output queuing circuits on all output lines and after the input queuing circuits on all input lines so off chip line driving is preserved on the appropriate lines whenever output queuing circuits are bypassed thus minimizing delays due to off chip loads.

22 Claims, 6 Drawing Sheets

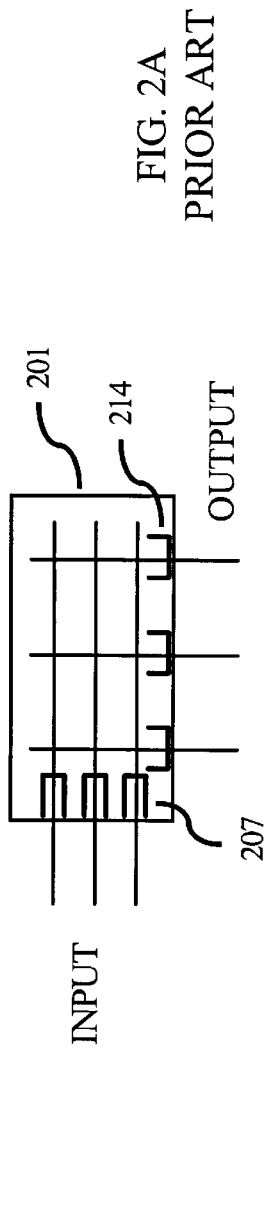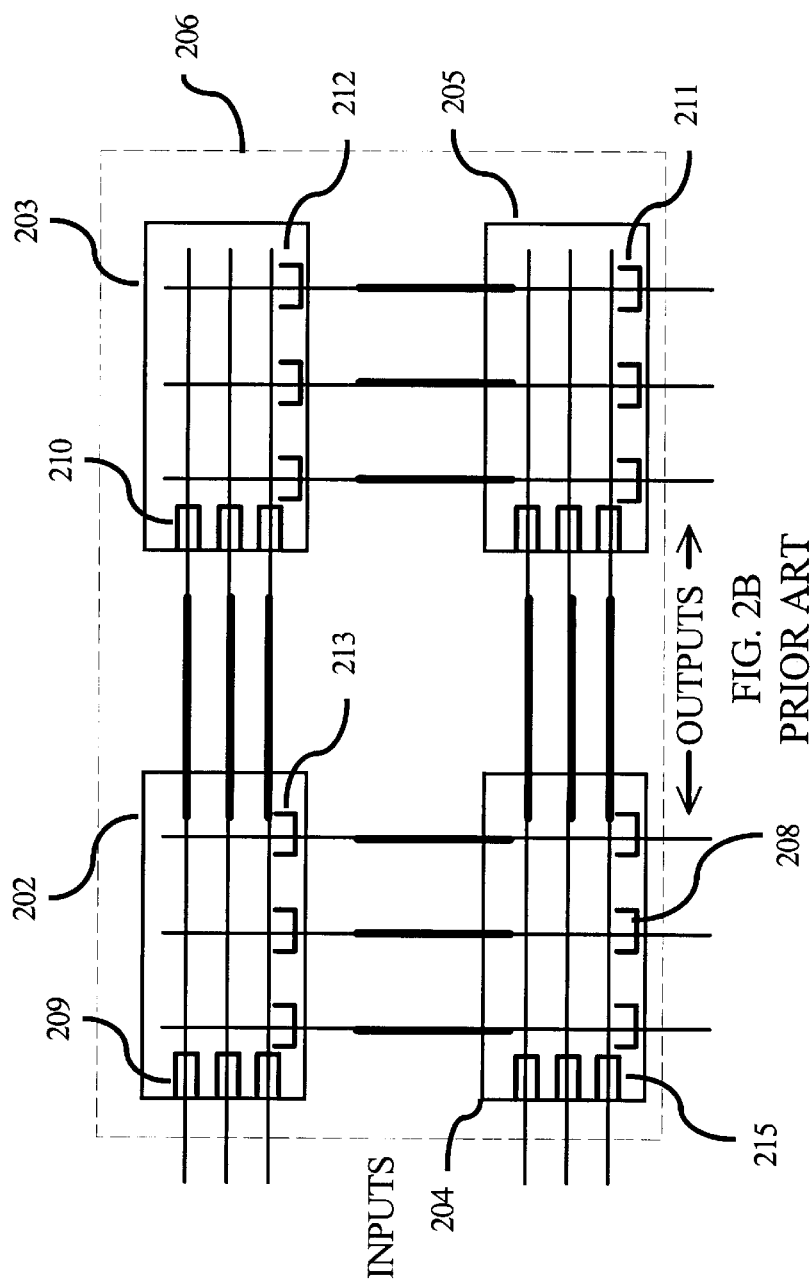

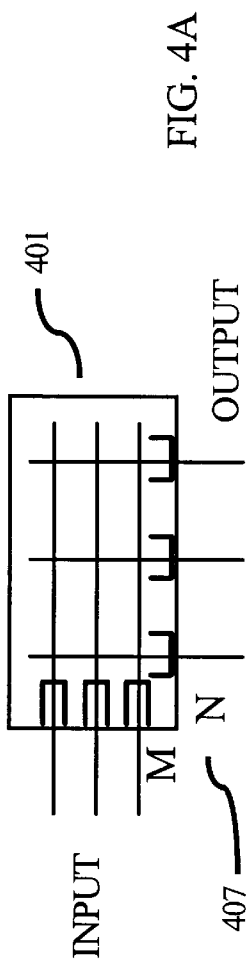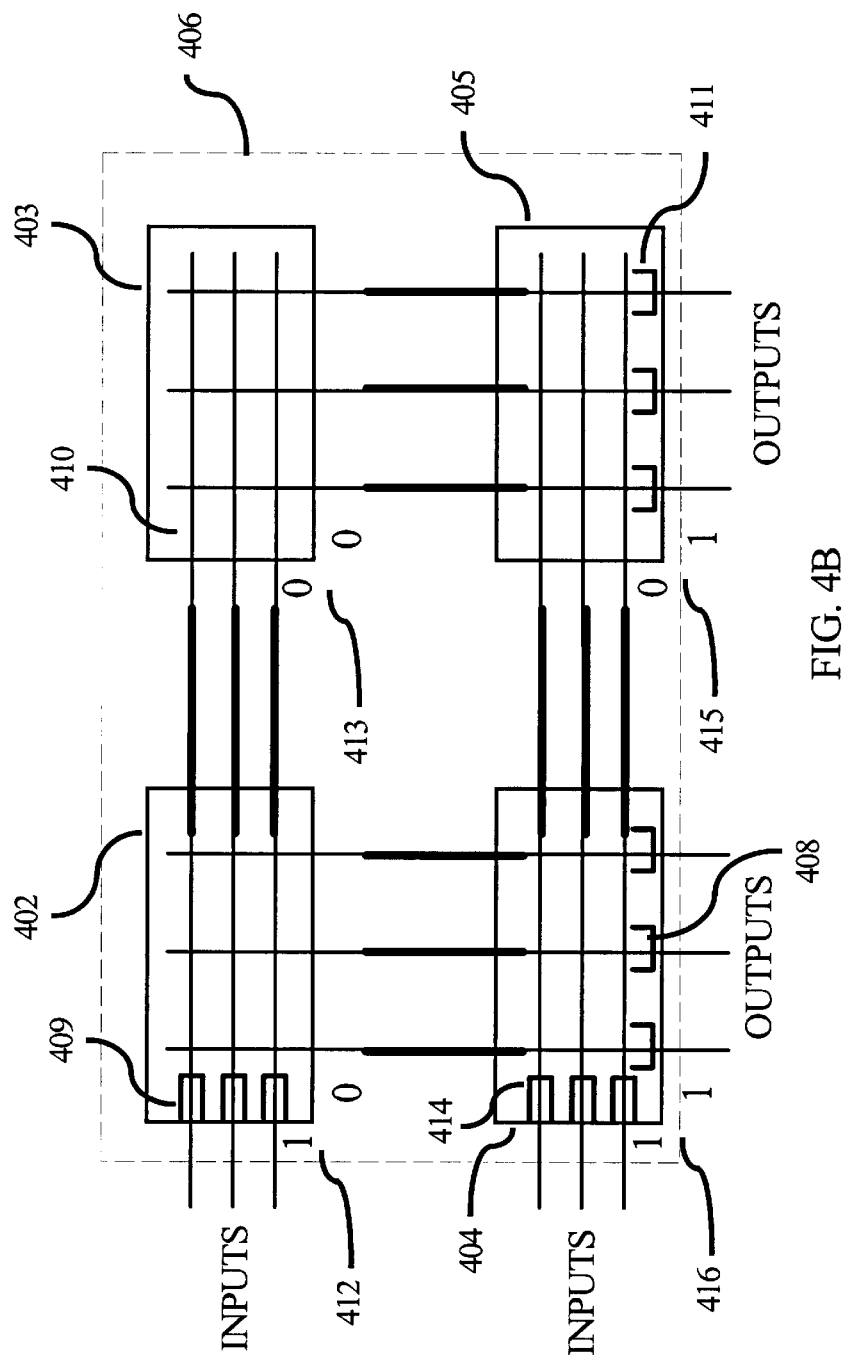

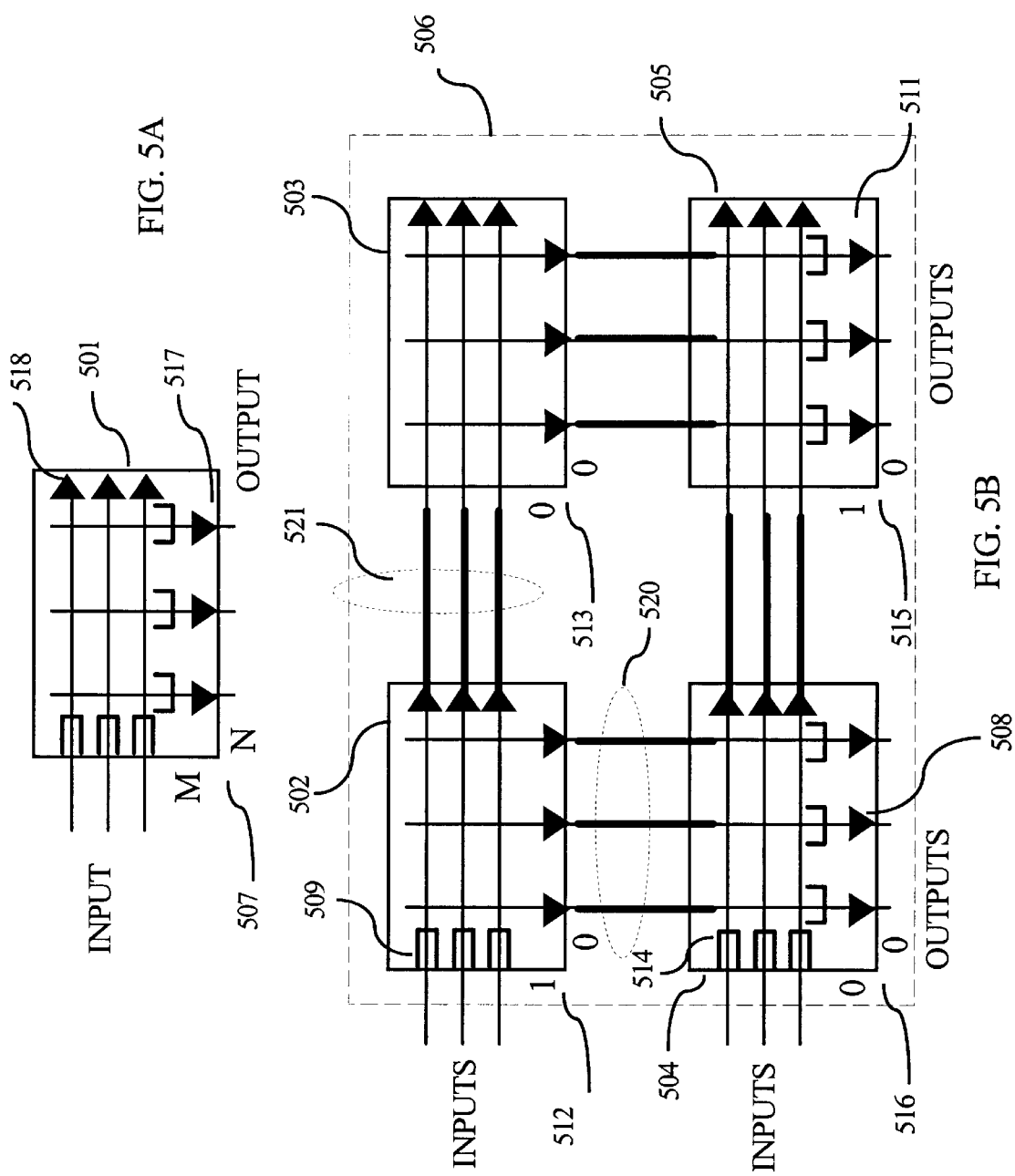

SCALABLE CROSSBAR SWITCH

TECHNICAL FIELD

The present invention relates in general to data processing systems, and in particular, to crossbar switches that are scalable and may be increased in size by coupling together smaller crossbar switch elements as building blocks.

BACKGROUND INFORMATION

Crossbar switching fabrics (the way signals are routed from input to output) are inherently easy to understand and are well documented in the literature. With their long legacy in voice systems which started with the crossbar central office, circa 1930, they are well known to those in the switching business, hence they are often looked at as quick entry points into the data switching environment.

Some crossbar switches have the advantage in that they are typically non-blocking. This means that when a particular input path is connected to an output path the other inputs and outputs are available for connection. In non-blocking crossbar switches, the "made" connection does not interfere with those remaining. When a crossbar switch is used for data switching applications, requirements within the data communication protocols put added burdens on the crossbar switch creating two fundamental problems. The first problem is how to schedule the switching fabric to take advantage of the variable size packets coming through the switching fabric and hence maximize the throughput. This problem is addressed by a technique called a "scheduled crossbar" which is being worked on by several researchers in the field and is not addressed in this disclosure. The second problem deals with issues that result if multiple single switch element building blocks are combined to make a larger, scalable switching fabric. Scaling crossbar switches in voice systems, especially using electromechanical switches or individual transistors, was relatively easy. FIGS. 1A and 1B illustrate how a basic switch element for voice systems was used to make a larger switch fabric. The switch building block 101 is used (in groups of four) to build a switching fabric 106 with a capacity twice that of an individual switch building block 101. Switch building blocks 102, 103, 104 and 105 are coupled to form crossbar switch fabric 106. Scaling the crossbar switch fabrics, illustrated in FIG. 1, has no inherent disadvantages because once a connection is set up there are essentially no delays, other than wiring delays, added to the switching fabric 106.

However, in a data switching fabric, it is necessary to provide some buffering or queuing at the input and output to the switching fabric to handle issues such as address lookup/manipulation, handling multicast and broadcast messages, etc. A single crossbar switch chip designed for data communication may lead to single switch element 201 as shown in FIG. 2A. The previously described buffering (queuing structure) is shown in FIG. 2A and FIG. 2B as the open-ended rectangles, input queue 207 and output queue 214. When multiples of single switch element 201 (e.g., switch elements 203, 204, 205, 209) are used to scale up a switching fabric 206 as shown in FIG. 2B, excess buffering or queuing is introduced internal to the overall switch fabric 206 which adds significant latency thus degrading switching fabric performance while providing no additional functional value. For example, output queue 213 is in series with output queue 208 and input queue 209 is in series with input queue 210. The switch element 201 is typically an integrated circuit chip incorporating the logic, switching, and queuing or buffering needed for a "N×N" switch element. These switch chips are then typically assembled on a printed circuit card to form a larger crossbar data communication switch.

Since it is desirable to make a single crossbar switch chip as the building block for making variable width crossbar switch fabrics for data communication, there is a need for a method to overcome the problem of scaling which would introduce unnecessary buffering delays.

SUMMARY OF THE INVENTION

A scalable crossbar switch is enabled by a single crossbar switch chip that is used to make variable sized crossbar switch fabrics. The single crossbar switch chip has input and output queuing necessary for handling data communication. The single crossbar switch chip also has drivers placed after output queuing and after input queuing.

Although the number (N) of switch chips are continuously expandable, i.e., 2, 3, 4, 5, switches are scaled by assembling in groups based on N squared. A switch fabric may comprise one, four, nine, sixteen, etc. chips. When switch assemblies are constructed using multiples of the switch chip, the switch chip outputs that couple to the inputs of another switch chip have their output queuing bypassed so the output drivers may drive off-chip loads without degrading performance by adding latency. Likewise inputs of one switch chip coupled to the outputs of another switch chip have their input queuing disabled or bypassed so queuing is done only once. The individual switch chips making up a larger crossbar switch assembly have configuration inputs that are selectively coupled to voltages that activate insertion or the bypassing of the queuing circuits. Which queuing circuits are bypassed is determined by where a particular switch chip is placed on a circuit board used to wire the switch chips into the larger crossbar switch assembly. In this manner, a larger crossbar switch may be made with a single switch design minimizing queuing delays and maintaining line driver buffering for all off chip outputs.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A and FIG. 2B illustrate a prior art 3×3 crossbar switch element with queuing on selected inputs and outputs;

FIG. 4A and FIG. 4B illustrate another 3×3 crossbar switch element and another 6×6 crossbar switch using embodiments of the present invention;

FIG. 5A and FIG. 5B illustrate another 3×3 crossbar switch element and another 6×6 crossbar switch made using embodiments of the present invention.

DETAILED DESCRIPTION

Figures 1A, 1B:
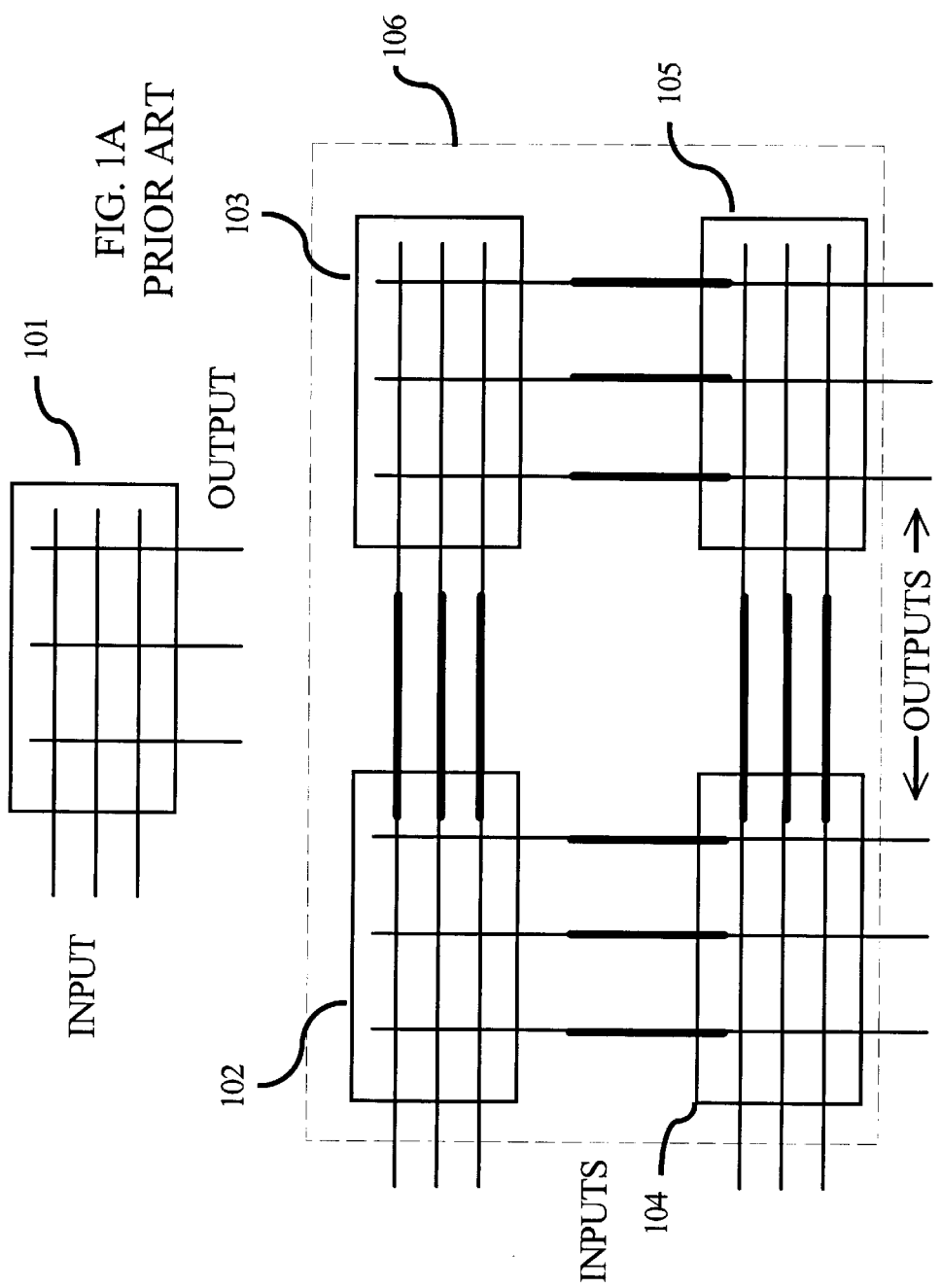
FIG. 1A and FIG. 1B illustrate a prior art three input and three output (3×3) crossbar switch element and also a coupling of four like elements to create a 6×6 crossbar switch.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1A and FIG. 1B illustrate a prior art voice grade crossbar switch. A switch element building block 101 is shown with three inputs and three outputs. In FIG. 1B, four switch element building blocks 102, 103, 104 and 105 are coupled to create a crossbar switch fabric 106 with six inputs and six outputs. Switch elements 102 and 104, in this example, are the only switch elements with external inputs (to crossbar switch fabric 106) and switch elements 104 and 105 have the only external outputs (from crossbar switch fabric 106). Even though all the switch elements are identical, once they are placed in a scaled switch fabric 106 their position changes their symmetry. Switch element 102 has external inputs, switch element 103 has no external inputs or outputs, switch element 104 has both external inputs and outputs and switch element 105 has external outputs.

FIG. 2A and FIG. 2B illustrate a switch chip 201 configured for data communication. In switch element 201, both the inputs and outputs have buffering or queuing to handle the requirements necessary for data communication. Input buffers 207 and output buffers 214 are illustrated by open rectangles in switch element 201. However, as with the switch element in FIG. 1, when four of the switch chips represented by switch chip 201 are assembled into a scaled switch fabric 206, the switch chips have different interface requirements depending on their location. Similar to the switch elements in FIG. 1, switch chip 202 has external inputs and as such needs buffers 209. However, since the outputs of switch chip 202 only feed the inputs of switch chip 203, input buffers 210 add unnecessary buffering. The same is true for the inputs of switch chip 205. The outputs of switch chip 202 feed only internal inputs of switch chip 204, therefore the output buffers 213 are unnecessary. Switch chips 202 and 203 also have duplicated buffering on their outputs. If the scaled switch fabric 206 is not to include the unnecessary buffering on certain inputs and outputs, then either each of the four switch chips would have to be different or a method to easily customize each chip by its placement with the switch fabric 206 is necessary.

Figure 3A:
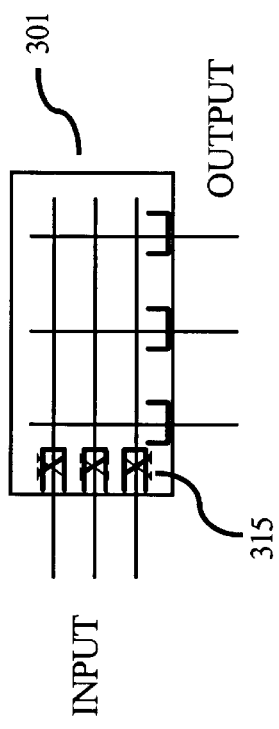
FIG. 3A and FIG. 3B illustrate a 3×3 crossbar switch element and a 6×6 crossbar switch using embodiments of the present invention.
Figure 3B:
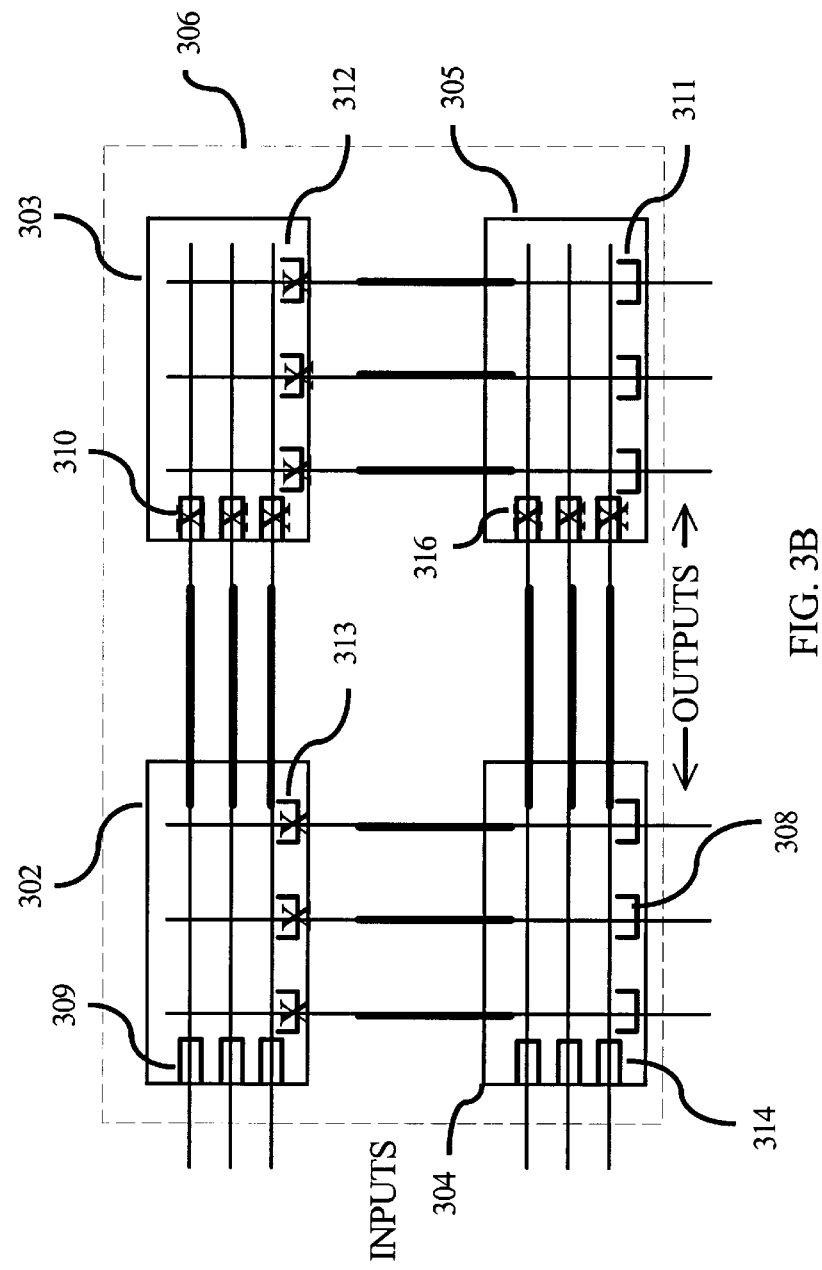

FIG. 3A and FIG. 3B illustrate, by placing Xs in the various buffers, which buffers need to be bypassed to eliminate unnecessary delays. In embodiments of the present invention, buffers may be bypassed by coupling each signal around the buffer circuits (creating a short delay path), for example, by using a logic gate which is enabled when the particular buffer associated with the logic gate is bypassed or disabled. A buffer may also be bypassed with a transmission gate or pass gate coupled around a buffer circuit. Again the transmission gate or pass gate would be enabled when the buffer is disabled removing buffering delay.

Switch chip 301 is illustrated as having its input buffers 315 bypassed. Crossbar switch fabric 306 is illustrated by coupling switch chips 302, 303, 304 and 305. Output buffers 312 and 313 along with input buffers 310 and 316 are shown bypassed. The input buffers 309 and 314 on switch chips 302 and 304 respectively are enabled as are output buffers 308 and 311 in switch chips 304 and 305. Any path from inputs to outputs of crossbar switch fabric 306, in this example, now has only two buffer stages (one input buffer and one output buffer).

FIG. 4A and FIG. 4B illustrate an embodiment of the present invention where control inputs are used to selectively enable or disable input and output buffering. For example, switch chip 401 has two control inputs 407 shown as "M" and "N". Control input M is associated with the input buffers and N with the output buffers. If control input M is a logic one then the input buffers are enabled and likewise if M is a logic zero then the input buffers are bypassed. Control input N provides the same function for the output buffers. In embodiments of the present invention, these inputs are wired to external pins of switch chip 401 and become "hardwired inputs" which are wired to specific voltages levels when they are placed onto a circuit card used for constructing an exemplary crossbar switch fabric 406. In FIG. 4B, four switch chips, 402, 403, 404 and 405 make up switch fabric 406. Switch chip 402 has control inputs 412. The logic one on control input 412 indicates that the input buffers 409 are enabled and thus they are shown as open rectangles in series with the inputs. The logic zero on control input 412 indicates that the output buffers of switch chip 402 are bypassed and thus they are not shown. This same method is used to illustrate how the various input and output buffers of the remaining switch chips 403, 404 and 405 are either enabled or bypassed depending on their location within switch fabric 406. Control input 413 bypasses both input and output buffers of switch chip 403 while control input 416 enables both the input buffers 414 and the output buffers 408 of switch chip 404. Finally control input 415 enables the output buffers 411 while bypassing the input buffers (not shown) of switch chip 405. The control inputs 412, 413, 415 and 416 are wired to particular potentials depending on where the switch chips are placed on the circuit card implementing crossbar switch fabric 406. This "hardwiring" customizes each switch chip building block depending on its location in the switch fabric.

FIG. 5A and FIG. 5B illustrate embodiments of the present invention where line drivers are added to a switch chip building block 501. Switch chip 501 has all features necessary for a crossbar switch building block. Inputs and outputs have buffering or queuing illustrated by the series open rectangles. Additionally, the inputs of switch chip 501 have line drivers 518 located after the input buffers and output line drivers 517 located after output buffers. Switch chip 501 also has control inputs 507 with M controlling the input buffers and N controlling the output buffers. When constructing a scaled switch fabric, the various chips, for example switch chips 502, 503, 504 and 505 are coupled so their interconnection is off chip or external to the chips (e.g., connections 521 and 520). Adding line drivers will improve performance for driving these off chip connections. Constructing a crossbar switch fabric 506, for example, using embodiments of the present invention has limits to scaling the switching fabric determined by the delta latency between the shortest path and the longest path through the fabric. The delta latency is typically very small compared to other latencies such as the queuing latency in the input/output buffers, and hence in all practical scale ups (for example 2–16 X), this delta latency may be negligible. When switch chips 502, 503, 504 and 505 are assembled to form an exemplary crossbar switch fabric 506, the control inputs 512, 513, 515 and 516 configure the chips by enabling or bypassing various input and output buffers. In FIG. 5, input buffers 509 and 514 are enabled as are output buffers 508 and 511. By locating the line drivers as shown in exemplary switch chip 501, a line driver is always positioned to drive off chip connections whether for inter-chip connection (520 and 521) or connections external to exemplary switch fabric 506.

Figure 6:
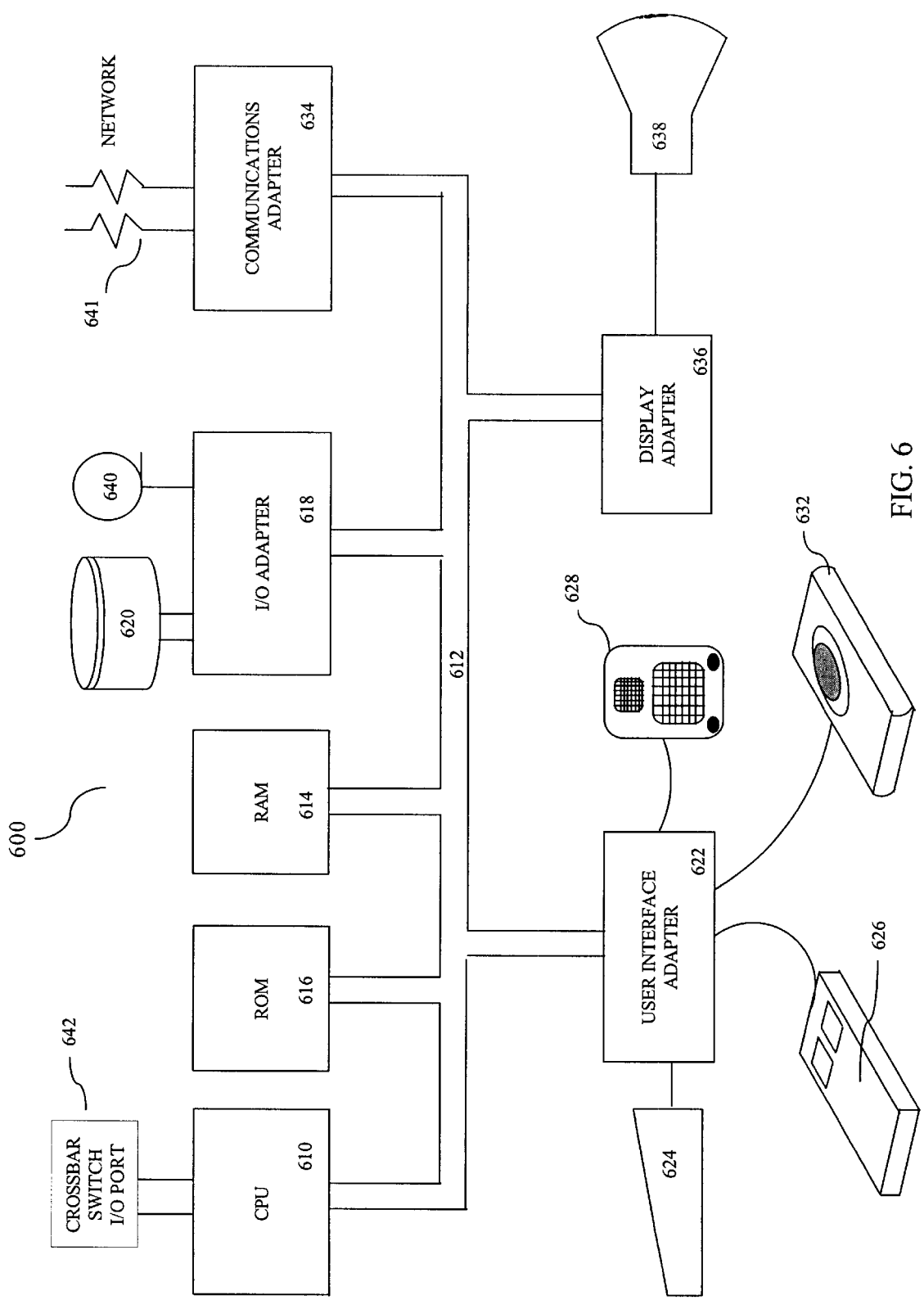
FIG. 6 illustrates a data processing system useable with embodiments of the present invention.

Referring to FIG. 6, an example is shown of a data processing system 600 which may use embodiments of the present invention. The system has a central processing unit (CPU) 610, which is coupled to various other components by system bus 612. CPU 610 also has a crossbar switch I/O port 642. Crossbar switch I/O port 642 may be used to interconnect CPU 610 to other CPUs (not shown), I/O devices, or to additional shared memory (not shown) via a crossbar switch fabric (not shown). I/O port 642 includes a crossbar fabric as illustrated in previous figures. Read-Only Memory ("ROM") 616 is coupled to the system bus 612 and includes a basic input/output system ("BIOS") that controls certain basic functions of the data processing system 600. Random Access Memory ("RAM") 614, I/O adapter 618, and communications adapter 634 are also coupled to the system bus 612. I/O adapter 618 may be a small computer system interface ("SCSI") adapter that communicates with a disk storage device 620. A communications adapter 634 may also interconnect bus 612 with an outside network 641 enabling the data processing system to communicate with other such systems. Input/Output devices are also connected to system bus 612 via user interface adapter 622 and display adapter 118. Keyboard 624, track ball 632, mouse 626, and speaker 628 are all interconnected to bus 612 via user interface adapter 622. Display 638 is connected to system bus 612 and display adapter 636. In this manner, a user is capable of inputting to the system through the keyboard 624, trackball 632, or mouse 626, and receiving output from the system via speaker 628, and display 638.

Embodiments of the present invention describe a technique which allows crossbars switching fabrics to be scaled, and data communication application, using multiples of the single unique chip by providing means to selectively bypass input or output queues. Other embodiments of the present invention output drivers are added to each line on each chip to remove the limit the number of like chips that can be coupled to make larger crossbar switches.

Although the present invention and its advantages have been described in detail, it should be understood that various changes, substitutions and alterations can be made herein without departing from the spirit and scope of the invention as defined by the appended claims.

What is claimed is:

1. A scalable crossbar switch for data communication comprising:
   a plurality of like switch chips;
   a circuit board for coupling together said plurality of said like switch chips to construct a scalable crossbar switch; and
   wiring patterns at each chip site, said wiring patterns wiring inputs and outputs and configuration pins on each of said plurality of like switch chips, said configuration pins customizing each of said switch chips as a particular element of said scalable crossbar switch by selectively enabling or disabling input/output queuing circuits.

2. The scalable crossbar switch of claim 1, wherein said configuration pins comprise, a first pin coupled to an input queuing enable and the a second pin coupled to an output queuing enable.

3. The scalable crossbar switch of claim 1, wherein input drivers are placed after selected input queuing circuits and output drivers are placed after selected output queuing circuits.

4. The scalable crossbar switch of claim 3, wherein said input queuing circuits coupled to outputs of other of said switch chips are disabled.

5. The scalable crossbar switch of claim 3, wherein said output queuing circuits coupled to inputs of other of said switch chips are disabled.

6. A method of constructing a scalable crossbar switch comprising the steps of:
   creating a plurality of like switch chips with separate signal inputs, outputs and configuration inputs; and
   creating wiring patterns at each chip site, said wiring patterns coupling said signal inputs and outputs and said configuration inputs on each of said plurality of like switch chips, said wired configuration inputs customizing each of said like switch chips as a particular element of said scalable crossbar switch by enabling and disabling selected ones of input/output queuing circuits.

7. The method of claim 6, wherein said configuration pins comprise, a first pin coupled to an input queuing enable and the a second pin coupled to an output queuing enable.

8. The method of claim 6, wherein input drivers are placed after selected input queuing circuits and output drivers are placed after selected output queuing circuits.

9. The method of claim 8, wherein said input queuing circuits coupled to outputs of other of said switch chips are disabled.

10. The method of claim 8, wherein said output queuing circuits coupled to inputs of other of said switch chips are disabled.

11. A data processing system, comprising:
    a central processing unit (CPU);
    shared random access memory (RAM);
    read only memory (ROM);
    an I/O adapter;
    a display adapter;
    a display,
    a user interface adapter; and
    a data communication port coupled to a scalable crossbar switch, said
    scalable crossbar switch comprising:
      a plurality of like switch chips;
      a circuit board for coupling together said plurality of said like switch chips to construct a scalable crossbar switch; and
      wiring patterns at each chip site, said wiring patterns wiring inputs and outputs and configuration pins on each of said plurality of like switch chips, said configuration pins customizing each of said switch chips as a particular element of said scalable crossbar switch by selectively enabling or disabling input/output queuing circuits.

12. The data processing system of claim 11, wherein said configuration pins comprise, a first pin coupled to an input queuing enable and the a second pin coupled to an output queuing enable.

13. The data processing system of claim 11, wherein input drivers are placed after selected input queuing circuits and output drivers are placed after selected output queuing circuits.

14. The data processing system of claim 13, wherein said input queuing circuits coupled to outputs of other of said switch chips are disabled.

15. The data processing system of claim 13, wherein said output queuing circuits coupled to inputs of other of said switch chips are disabled.

16. An crossbar switch fabric for data communication comprising:

a plurality N×N like switch chips, said plurality of N×N switch chips further arranged in an N by N array wherein N is a number 2 or greater, said like switch chips comprising:
buffered inputs wherein each buffered input is coupled to an input queuing circuit;
buffered outputs wherein each buffered output is coupled to an output queuing circuit;
an input queuing enable input, said input queuing enable input operable to bypass said queuing circuits of said buffered inputs;
an output queuing enable input, said output queuing enable input operable to bypass said queuing circuits of said buffered outputs; and
crossbar switching circuits coupled to said buffered inputs and buffered outputs;

(N-1) of said like switch chips coupled as input switch chips with buffered inputs coupled external to said switch fabric and buffered outputs coupled internally to said switch fabric wherein input queuing circuits of said N-1 input switch chips are not bypassed and output queuing circuits of said N-1 input switch chips are bypassed;

(N-1) of said like switch chips coupled as output switch chips with buffered outputs coupled external to said switch fabric and buffered inputs coupled internally to said switch fabric wherein output queuing circuits of said N-1 output switch chips are not bypassed and input queuing circuits of said N-1 output switch chips are bypassed;

(N-1)×(N-1) of said like switch chips coupled as internal switch chips with both buffered inputs and buffered outputs not connected external to said switch fabric wherein said input and output queuing circuits of said (N-1)×(N-1) internal switch chips are bypassed; and one of said like switch chips coupled as an input/output switch chip with both buffered inputs and buffered outputs coupled external to said switch fabric wherein said input and output queuing circuits of said input/output switch chip are not bypassed.

17. The crossbar switch fabric of claim 16, wherein a line driver is coupled to each buffered input after each of said input queuing circuits and a line driver is coupled to each buffered output after each of said output queuing circuits, said line drivers driving switch outputs coupled internal or external to said switch fabric.

18. A scalable crossbar switch for data communication comprising:

a plurality of like switch chips;

a circuit board for coupling together said plurality of said like switch chips to construct a scalable crossbar switch, and wiring patterns at each chip site, said wiring patterns coupling inputs, outputs, and address inputs of said plurality of like switch chips, said address inputs selectively customizing each of said switch chips as a particular element of said scalable crossbar switch, further said address inputs operable to allow configuration data to be sent to each chip based on its address input, said configuration data selectively enabling or disabling input/output queuing circuits.

19. The scalable crossbar switch of claim 18, wherein said configuration data comprises, a first bit coupled to an input queuing enable and a second bit coupled to an output queuing enable.

20. The scalable crossbar switch of claim 18, wherein input drivers are placed after selected input queuing circuits and output drivers are placed after selected output queuing circuits.

21. The scalable crossbar switch of claim 20, wherein said input queuing circuits coupled to outputs of other of said switch chips are disabled.

22. The scalable crossbar switch of claim 20, wherein said output queuing circuits coupled to inputs of other of said switch chips are disabled.

* * * * *